United States Patent [19]
Farrer et al.

[11] 4,319,316
[45] Mar. 9, 1982

[54] CONTROLLED POWER SUPPLY APPARATUS

[75] Inventors: Michael Farrer, Linton; Raymond A. G. Perryman, Newmarket, both of England

[73] Assignee: Gould Advance Limited, Hainault, England

[21] Appl. No.: 90,061

[22] Filed: Oct. 31, 1979

[51] Int. Cl.³ .............................................. H02M 1/12
[52] U.S. Cl. ...................................... 363/41; 363/132
[58] Field of Search ................... 363/56, 41, 131–134

[56] References Cited

U.S. PATENT DOCUMENTS

| | | | |
|---|---|---|---|
| 3,361,952 | 1/1968 | Bishop | 363/133 |
| 3,667,027 | 5/1972 | Martin | 363/56 |
| 3,683,208 | 8/1972 | Burens | 363/134 X |
| 4,199,807 | 4/1980 | Crowe et al. | 363/132 |

FOREIGN PATENT DOCUMENTS

| | | |
|---|---|---|
| 1047108 | 1/1979 | Canada .............................. 363/133 |
| 1051463 | 12/1966 | United Kingdom . |
| 1361646 | 7/1974 | United Kingdom . |
| 1554214 | 10/1979 | United Kingdom . |

*Primary Examiner*—William M. Shoop
*Attorney, Agent, or Firm*—Laubscher, Philpitt & Laubscher

[57] ABSTRACT

Power supply apparatus is disclosed including an inverter, such as a half-bridge inverter, and control means for controlling the frequency of operation of the inverter. The control means includes a further control winding on the transformer of the invertor, and means for applying a short circuit of one or other or both polarities to the control winding in order to activate a switching transition of the inverter. In one embodiment, the control means is used to fix the frequency of operation of a free-running inverter; in another embodiment, short circuits of both polarities are applied to the control winding for an overlap period in order to provide a "dwell" period between switch-off of one inverter transistor and switch-on of the other, this method of operation providing pulse width modulation control of the output waveform of the inverter.

21 Claims, 6 Drawing Figures

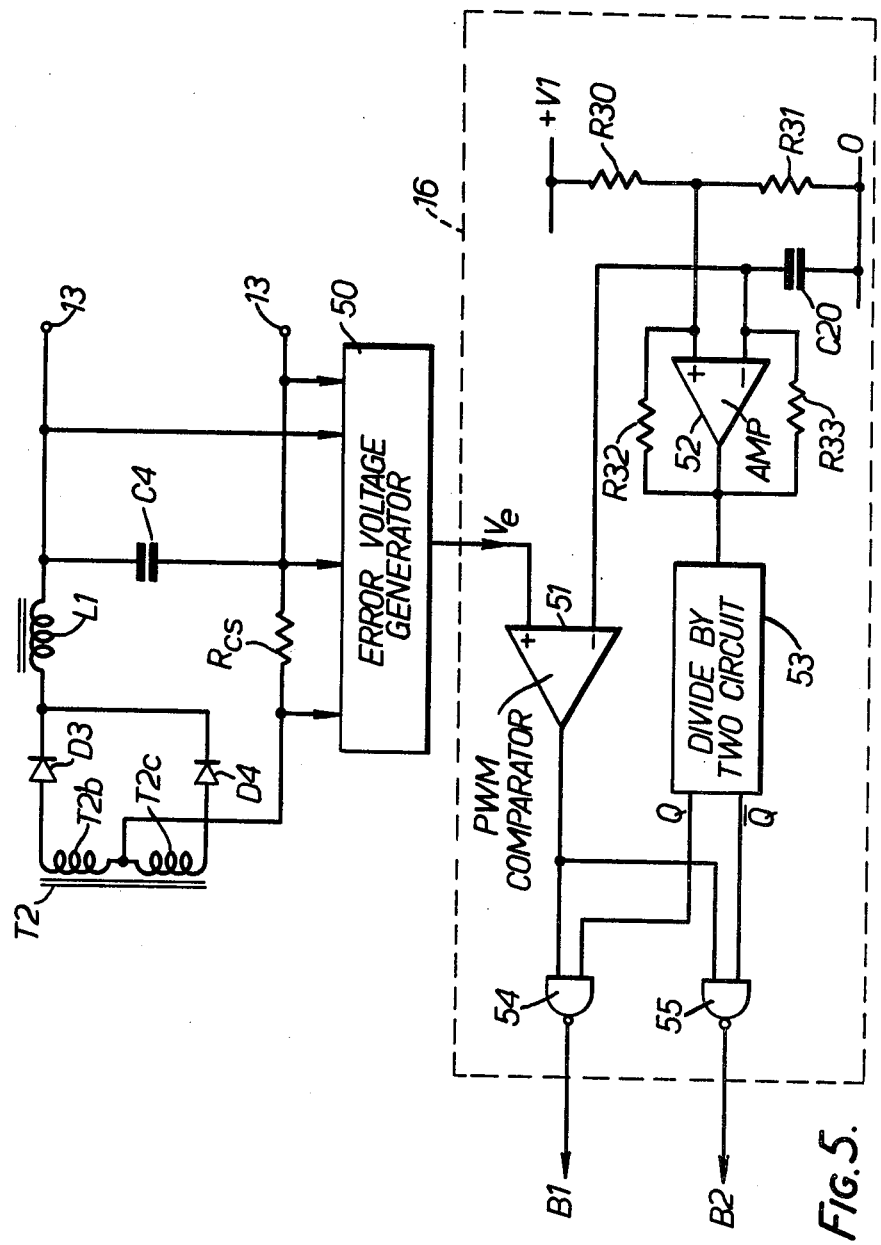

CONTROLLED POWER SUPPLY APPARATUS

FIELD OF THE INVENTION

This invention relates to electric power supply apparatus of the type in which, by means of one or more semiconductor devices, a first unidirectional input voltage is switched at a relatively high frequency. The switched voltage is fed to a transformer the output of which may be rectified to produce a second unidirectional output voltage, usually differing from the input voltage. Such a system is usually referred to as a voltage converter; when the output of the transformer is not rectified and an alternating output voltage is thereby produced, the system is known as an inverter. The use of the term "inverter" in this specification is intended to include systems providing one and/or other type of output voltage. The unidirectional input to the inverter may itself be obtained by rectification of an alternating current supply.

DESCRIPTION OF THE PRIOR ART

Various voltage inverter circuits have previously been proposed, for example in U.S. Pat. No. 4,164,014 assigned to the assignees of the present application, one circuit disclosed therein being the half-bridge inverter which is further described hereinafter. Such an inverter, in common with other inverters of the feedback variety, makes use of a saturable transformer with windings provided for the switched current flowing through the semiconductor switching devices, and a feedback current arranged to control the switching devices. The saturation characteristics of the transformer are chosen to allow switching of each device, by means of the feedback mechanism, when the switched current has induced a sufficient current in the feedback winding to effect a switching transition in the appropriate switching device. Such a circuit is known as a free-running inverter, the term implying that there is no external control of the frequency of operation, i.e. switching, of the inverter.

Known circuits of this type are often said to operate nominally at a fixed frequency. However, this frequency is determined by a number of factors, all of which are variable; e.g., the voltage characteristics of the switching device or devices, the saturation parameters of the switching transformer, including the core area and number of turns. Even when this frequency is established for a particular inverter by the various factors mentioned above, the frequency is liable to drift due to temperature variations and ageing. In fact, even with the core type and number of turns in the transformer determined, the variation in frequency can still be of the order of 30% from the nominal frequency. It is therefore virtually impossible to guarantee a substantially fixed operating frequency between samples of inverters of this type.

In many applications, it is advantageous to control the output of a voltage inverter. For example, the output voltage may be regulated to remain constant despite variations in the input voltage and/or in the load parameters presented to the inverter. Circuits have been proposed which perform such a function on the voltage available at the secondary winding of the inverter output transformer. Such circuits are often comparatively inefficient in that the full available output voltage is presented to the secondary winding of the output transformer, and only subsequently is this output voltage reduced by some suitable action, e.g. further switching of the output waveform.

SUMMARY OF THE INVENTION

It is an object of the present invention to provide electric power supply apparatus which includes an inverter whose characteristics are controlled by a pulse generator operating at a predetermined frequency.

It is a further object of the present invention to provide electric power supply apparatus including an inverter whose frequency of operation is set by a pulse generator of predetermined frequency.

It is a still further object of the present invention to provide electric power supply apparatus which includes an inverter providing a switching waveform whose frequency and duty ratio is controlled by a pulse generator of predetermined frequency.

The present invention provides power supply apparatus including an inverter circuit arranged to be connected to a unidirectional voltage source, said inverter circuit comprising a transformer having primary and secondary winding means, and switching means arranged to switch said unidirectional voltage source in response to control signals thereby to produce an alternating current in said primary winding means, said secondary winding means of said transformer being connected to said switching means whereby to provide said control signals, the improvement wherein the transformer includes control winding means, and the apparatus further comprises control pulse generator means arranged to provide at least one train of pulses at a predetermined frequency, and short circuit switching means connected to said pulse generator means and to said control winding means, and being arranged to apply an effective short circuit to said control winding means in response to pulses from said pulse generator means whereby to control the frequency of operation of said inverter circuit.

A first embodiment operates to control the frequency of the inverter circuit by applying an effective short circuit to the control winding means at intervals set by the frequency of the pulse generator means. The inverter switching means is responsive to the applied short circuit via the control and secondary winding means to switch the voltage source at this frequency.

A second embodiment makes use of a particular configuration of pulses applied to the short circuit switching means in order to provide pulse width modulation of the inverter output. The degree of pulse width modulation may be controlled, e.g. in response to an output parameter of the inverter, by varying the duty ratio within each cycle of pulses applied to the short circuit switching means.

BRIEF DESCRIPTION OF THE DRAWINGS

FIG. 5 is a circuit diagram showing parts of the inverter of FIG. 1, further including a second embodiment of the control means suitable for a second mode of operation.

DESCRIPTION OF THE PREFERRED EMBODIMENTS

Figure 1:
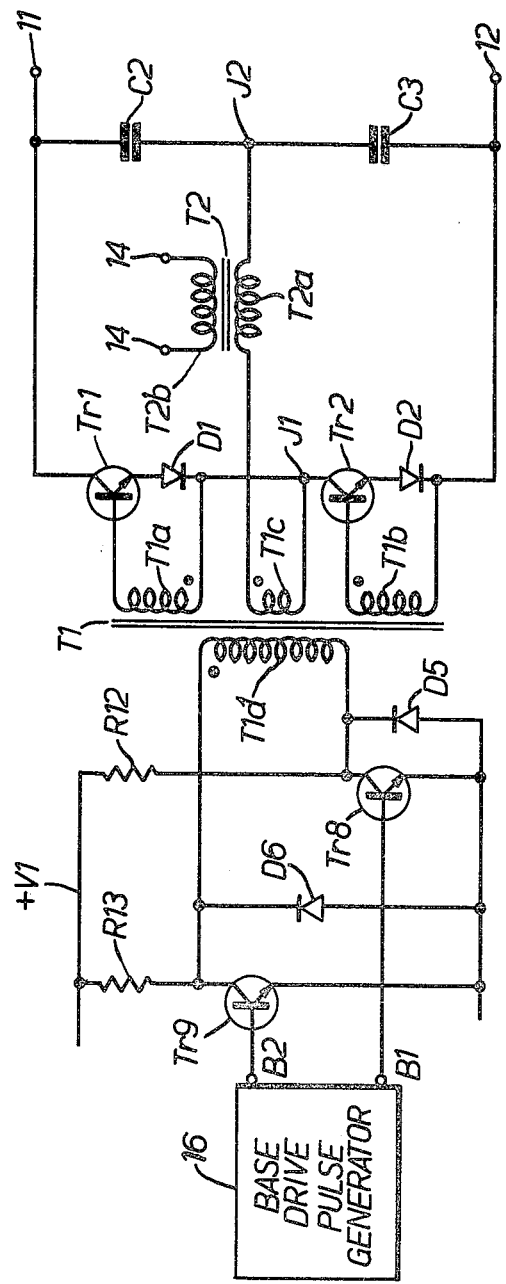
FIG. 1 is a circuit diagram of a voltage inverter including control means.

In the voltage inverter shown in FIG. 1, a first unidirectional voltage is applied between input terminals 11 and 12, such that terminal 11 is positive with respect to terminal 12. Such a voltage may be derived from an alternating current supply fed through a known rectifier-filter network; alternatively, the voltage may be derived from a battery. Between these input terminals there is connected a series combination of two unidirectional transistor switching devices, joined at a junction point J1. The switching devices are formed by transistors Tr1, Tr2, each in series with a respective diode D1, D2. A transformer T1 has a first secondary winding T1a connected between the base of transistor Tr1 and the common junction point J1 and a second secondary winding T1b connected between the base of transistor Tr2 and the negative terminal 12. Also shunted between input terminals 11 and 12 is the series combination of two capacitors C2 and C3, having a junction point J2. In a manner to be described, voltages appearing between points J1 and J2 are fed to the primary winding T2a of a transformer T2.

Figure 4:
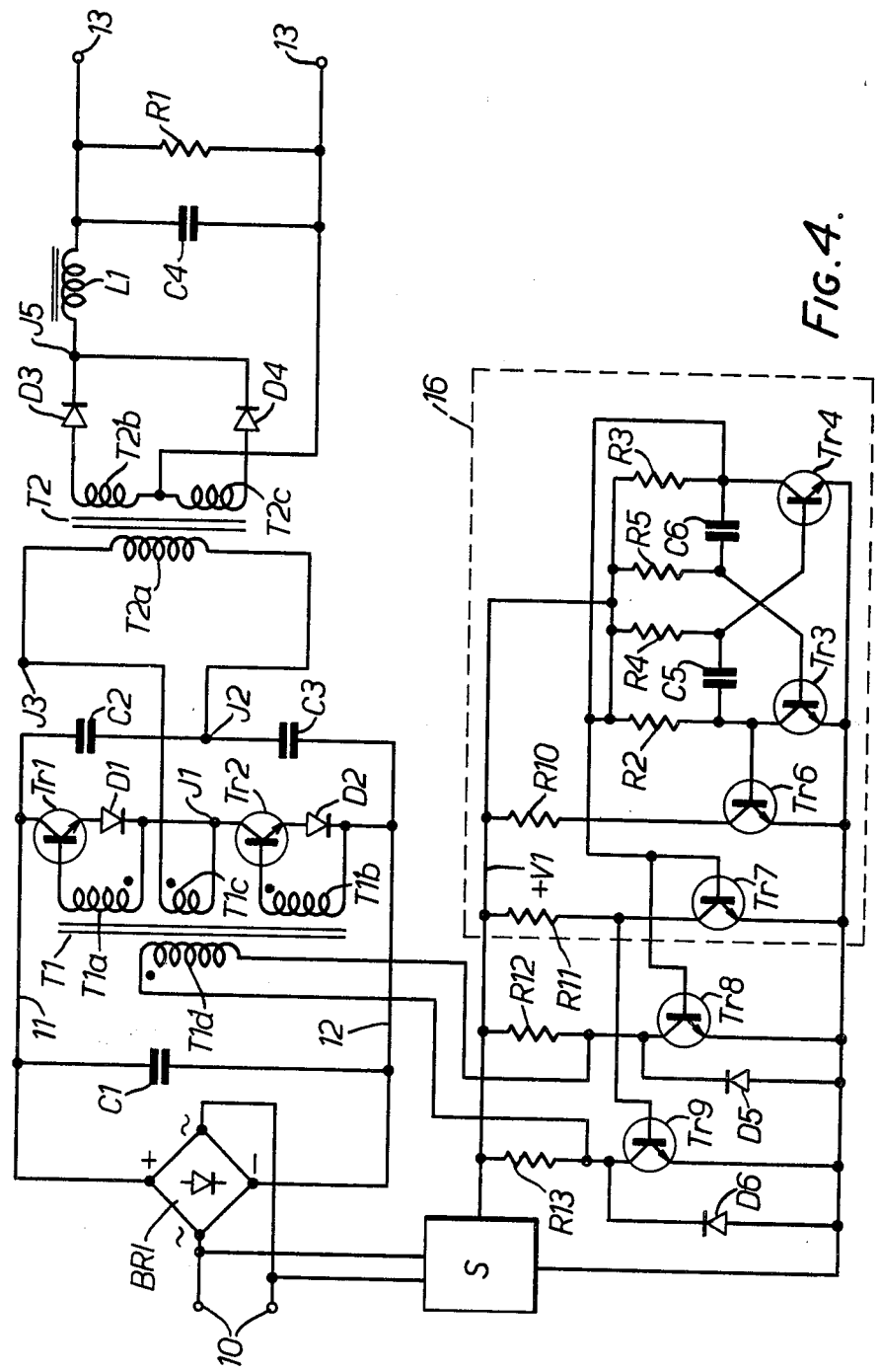
FIG. 4 is a circuit diagram of the inverter of FIG. 1, further including one embodiment of the control means shown in more detail.

Junction point J1 is connected to one end of winding T2a by way of the primary winding T1c of the transformer T1 while junction point J2 is connected to the other end of winding T2a. Transformer T2 has a secondary winding T2b and the voltage across this winding appears between terminal 14. This voltage may then be rectified by a rectifier, comprising, in the embodiment of FIG. 4, diodes D3 and D4, and filtered by the filter comprising an inductor L1 and capacitor C4, the latter being shunted by a bleed resistor R1 as shown in FIG. 4. The filtered unidirectional output appears at output terminals 13. Alternatively an A.C. output appears at terminals 14 as shown in FIG. 1.

Transformer T1 operates in conjunction with transistors Tr1 and Tr2 to produce periodic reversals of the voltage applied to the primary winding T2a of transformer T2 and the output feeds any load circuit connected to terminals 14. When current is drawn from terminals 14, a load is reflected back to the primary winding of transformer T2 and must be provided by that one of the two transistors Tr1, Tr2 which is then supplying current. If transistor Tr1 is conductive, additional base current will be induced in winding T1a, due to the flow of current in winding T1c which, being in series with winding T2a, carries the reflected load current. The transformer T1 is designed to saturate in operation, and the transformer will be driven to the point of saturation by the progressively increasing voltage-time integral impressed on winding T1a due to the constant voltage drop presented by the base-emitter voltage Vbe of transistor Tr1 together with the forward voltage drop Vf of diode D1. Due to this saturation, 'suck-out' of base current occurs (i.e. carriers are drained off from the base area), the voltage of winding T1a is insufficient to overcome the voltage (Vbe+Vf) and the transistor will be turned off.

When transistor Tr1 turns off, the rate of change of flux in the core of transformer T1 reverses and this flux change induces in winding T1b a voltage in a sense to cause transistor Tr2 to conduct. The current passed by transistor Tr2 flows through the winding T2a of transformer T2 in a direction producing a flux opposite to the current of transistor Tr1.

The time now taken to saturate transformer T1 depends on the base-emitter voltage drop of transistor Tr2 and the forward voltage drop of D2. When saturation occurs, transistor Tr2 ceases to conduct in a manner similar to transistor Tr1.

The circuit thus-far described is the known half-bridge inverter. This is normally a free-running inverter whose frequency of switching is determined by a number of factors, all of which are variable; Vf of D1 or D2, Vbe of Tr1 or Tr2, Bsat of T1, core area and number of turns, and the storage time of Tr1 or Tr2. This can be further affected by temperature and base current, as well as ageing of components as previously mentioned, leading to a variation in frequency which can be as much as 30%.

In order to regulate the frequency, turn "off" of Tr1 or Tr2 is caused other than by saturation of the core T1. To ensure that this is always the case, the natural frequency of oscillation which would occur due to core saturation is made to be lower than the controlled frequency.

The frequency is controlled by periodically applying a short-circuit across a further winding T1d of transformer T1 such that base current "suck out" occurs on the conducting transistor Tr1 or Tr2. If the short circuit is applied for too short a period then the transistor collector-emitter voltage will not have started rising (i.e. the transistor is still in storage time) and so on flux reversal will occur and when the short-circuit is released, current feedback continues again and the transistor stays conducting until core saturation of T1 occurs.

If however the short-circuit is applied for too long a period then transistor Tr1 or Tr2 will have turned "off" but the normal mechanicm which should occur to turn the next transistor "on" cannot take place as all of the base current drive that occurs due to the flux reversal of T1 flows through the short-circuit applied across winding T1d or T1. If the short-circuit is now released, there is no flux change and so no current flow. The oscillation stops, unless a pulse of current is applied at the instant the short-circuit is removed to turn the relevant transistor "on", or unless means are included, as for example described hereinafter, for providing a sufficient base drive current after removal of the short-circuit.

The basic elements of means for applying a short circuit across winding T1d are shown in FIG. 1. Two transistors Tr8 and Tr9 are connected as shown and each collector is connected to one terminal of the winding T1d. Diodes D5 and D6 are connected between the collectors and emitters of transistors Tr8 and Tr9 respectively as shown. Base drive is applied to the transistors Tr8, Tr9 from a base drive pulse generator 16 through terminals B1, B2 respectively. Resistors R12, R13 are connected between the collectors of transistors Tr8 and Tr9 respectively and a potential +V1.

Figure 2:
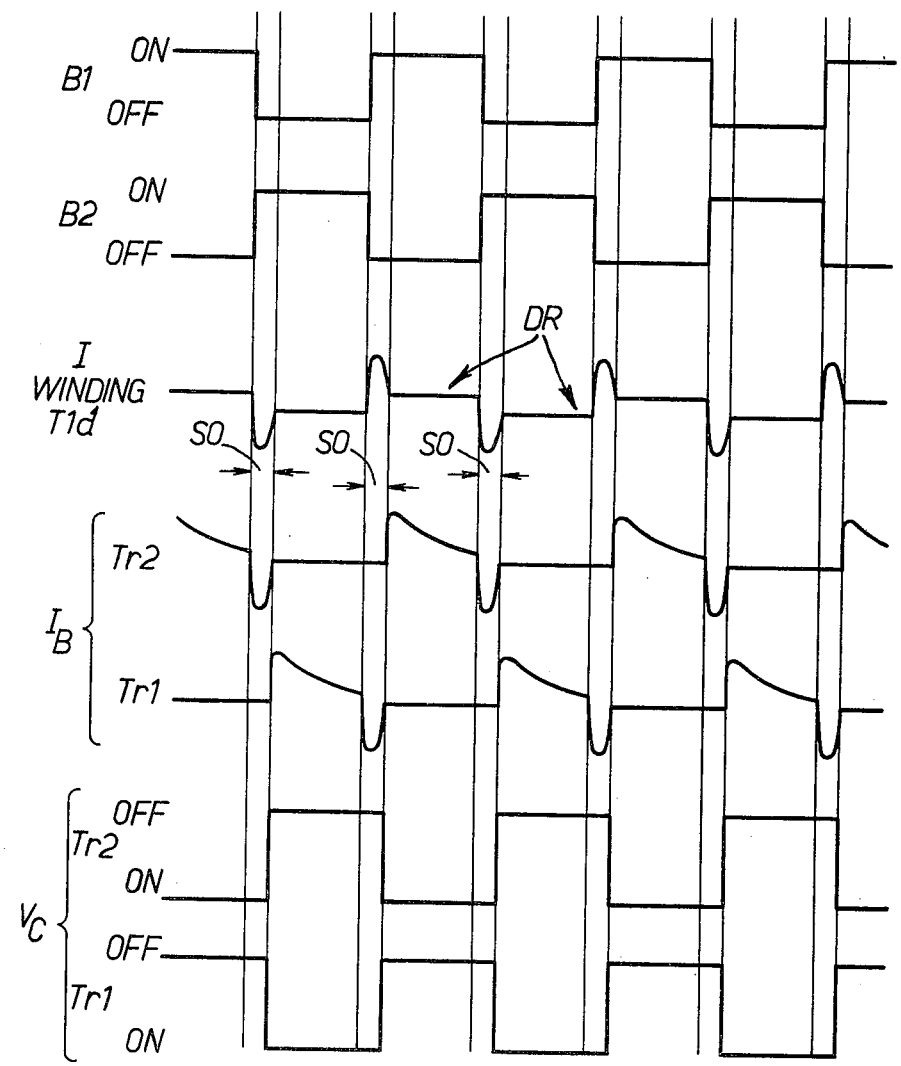
FIG. 2 shows waveforms at various points of FIG. 1 in a first mode of operation.

In operation, drive is applied to the bases of transistors Tr8, Tr9 to switch the transistors accordingly, as for example represented by waveforms $V_{B1}$ and $V_{B2}$ shown in FIG. 2 which are representative of one mode of operation. If transistor Tr8 or Tr9 is turned on with the correct polarity on winding T1d of transformer T1, then a short circuit is effectively presented on the winding T1d through either Tr9 and D5, or Tr8 and D6. If this short circuit occurs during the time that, for example, transistor Tr1 is conducting, then the flux linkage between winding T1a will be ineffective and the current flow in winding T1a will cease, causing transistor Tr1 to turn off and become non-conductive. It is arranged that the predetermined frequency of operation of the base drive pulses is higher than the natural or free-running frequency of operation of the oscillatory inverter circuit including the transformer T1 and transistor Tr1 and Tr2, so that the operation of this circuit is susceptible to control by the base drive pulses in this way. The frequency of the inverter is thus controlled by the frequency of the base drive pulses.

When voltage is first applied to the circuit at terminals 11, 12 or at very low output load currents there is insufficient current in winding T1c for the self-oscillatory action of Tr1, Tr2, and T1 to take place and under these conditions resistors R12 and R13 provide sufficient drive current to turn transistors Tr1 and Tr2 on and off in the manner of a driven inverter.

Referring to FIG. 1, consider the situation, as shown in the waveforms of FIG. 2, where Tr2 is on, Tr1 is off, Tr9 is off, and Tr8 is on. When it is desired to effect an inverter transistion, Tr8 turns off and Tr9 turns on. The positive end of T1d is connected to the negative terminal of supply V1 via Tr9, and the negative end of T1d attempts to go negative with respect to this terminal, but is clamped by D5. An effective short circuit is thus applied across T1d, and stored base charge starts to flow out of the base of Tr2 into the transformed short-circuit. This current continues to flow until the stored carriers are all cleared from the base of Tr2, and consequently Tr2 turns off; i.e. after completion of the base current "suck-out" shown as SO in FIG. 2. Tr1 then turns on by the usual flux-reversal mechanism in transformer T1, and the polarity of the voltage reflected on to winding T1d reverses, thus reversebiassing D5. The applied short circuit on winding T1d is thus removed automatically at the instant when Tr2 turns off. The remaining half-cycle (i.e. with transistors Tr2 'off' and Tr1 'on') will occur in a similar, but opposite, manner.

FIG. 4 shows a circuit including a fixed frequency base drive pulse generator 16 in greater detail. The pulse generator is in the form of an oscillator comprising two transistors Tr3 and Tr4 which, with resistors R2 to R5 and capacitors C5 and C6, are cross-connected to form a multivibrator. The oscillator receives a unidirectional supply voltage +V1 from a supply rail fed from a supply unit S itself fed from an input alternating voltage at terminals 10. Output from the oscillator is applied to the bases of further transistors Tr6, Tr7 which have collector resistors R10, R11 respectively fed from the rail +V1. The collectors of the transistors Tr6, Tr7 are connected respectively to the bases of the transistors Tr8 and Tr9 of FIG. 1. A square waveform is produced which results in alternate base drive pulses fed to transistors Tr8, Tr9 as described above.

Parts of the circuits common to FIGS. 1 and 4 are similar and designated by like reference numerals. FIG. 4 additionally shows a rectifying and filtering circuit including a bridge rectifier BR1 and filter capacitor C1 for producing the unidirectional voltage between terminals 11 and 12 from an alternating voltage supply. A further rectifying and filtering circuit is also shown to provide a unidirectional output at terminals 13 as described hereinabove.

The resistors R12 and R13 have two effects; the first is to supply drive via the winding T1d to transistors Tr1 and Tr2 to turn them 'on' when the transistors Tr3 and Tr4 turn 'off' respectively. This drive is arranged to be just sufficient to drive the inverter transistors Tr1 and Tr2 when there is no load current being drawn through Tr2, and is shown in FIG. 2 as portion DR of the waveform of current through winding T1d. When this condition occurs, the normal process of current feed-back through T1 would otherwise break down.

Figure 3:
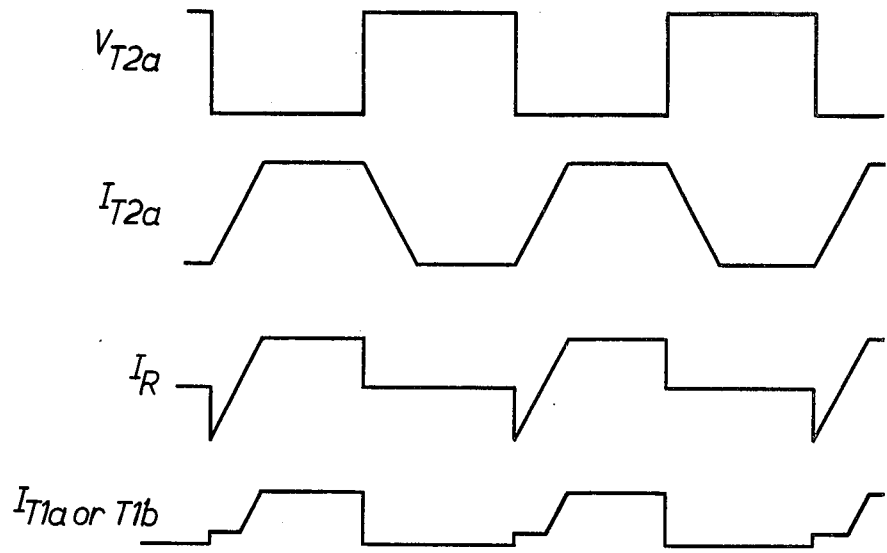
FIG. 3 shows waveforms at further points of FIG. 1 in the first mode of operation.

The second effect of R12 and R13 is to supply drive to turn Tr1 and Tr2 'on' when the output transformer T2 has a comparatively high leakage inductance between its primary and secondary. Waveforms for this situation are shown in FIG. 3. When a load current is being drawn, the effect of the leakage inductance is to "hold off" the voltage at the primary T2a of transformer T2 so that it is not transferred to the secondary T2b. Because of this condition there will not be any load current flowing in the primary T2a and so the mechanism of current feedback through T1 would not normally provide base drive current to transistors Tr1 and Tr2 as shown in waveform $I_R$ which represents the reflected primary current to either Tr1 or Tr2. However, in this case the relevant inverter transistor is turned 'on' by the drive provided by R12 or R13. Once the inverter transistor is 'on' and the primary current has risen to its final value then the voltage impressed upon the primary is transferred to the secondary T2b of transformer T2 and current feedback will take place, providing drive to the transistor. This effect is shown in the bottom waveform of FIG. 3 where the initial low current is provided by drive from the winding T1d and the subsequent higher current is derived from the reflected current IR.

The number of turns on the windings of transformer T1 is of importance to ensure sufficient interaction between the inverter switching section and the short-circuiting section. A suitable ratio between turns is 5:5:1:30 for windings T1a, b, c, d respectively.

The circuit shown in FIG. 4 includes a fixed-frequency oscillator providing complementary transistor base drives of constant mark-to-space ratio. However, the periods of time for which Tr8 and Tr9 are being driven on need not necessarily amount to the full half-cycle period of the oscillation as shown in the top two waveforms of FIG. 2. For instance, at the instant when it is desired to cause a transfer of conduction from Tr1 to Tr2, it is necessary to cause Tr8 to conduct for only as long as it takes to extract the excess base carriers from Tr1, and for Tr1 to turn off. This period is represented by the time SO taken for base current "suck out" to occur in FIG. 2. Tr8 may then be allowed to turn off for the remainder of the half-cycle. Similarly for the opposite transition, from Tr2 conducting to Tr1 conducting, Tr9 need be turned on only for as long as it takes to effect the transition. These minimum conduction periods for Tr8 and Tr9 may typically be of the order of 10 to 15$\mu$ Secs depending on the type of inverter transistors being used, the method of base charge extraction, the external load conditions, etc. In such a case, the base drive pulse generator 16 is arranged to generate relatively phased pulses of the appropriate width to transistors Tr8 and Tr9. A further mode of operation suitable for providing pulse width modulation (PWM) control of the output of the inverter utilizes a pulse generator 16 as shown in FIG. 5. The pulse generator 16 is arranged to provide overlapping periods of conduction of Tr8 and Tr9 by generating respective pulses to connections B1 and B2; the operation of the inverter with such pulses applied will be described hereinafter. The circuit of FIG. 5 is utilized in combination with the circuit of FIG. 1, but a D.C. output is provided from the inverter as shown, similarly to that of FIG. 4, by including a rectifying and filtering arrangement as previously described. A current sensing resistor $R_{cs}$ is also included as shown, and an error voltage generator 50 receives voltages indicative of the output current flowing through this resistor and of the output voltage at terminals 13, thereby an error voltage $V_e$ to the pulse generator 16 in response to these voltages.

The pulse generator 16 includes a PWM comparator 51 having the error voltage $V_e$ applied to one input thereof, and a ramp voltage applied to the other input. The ramp voltage is derived from an operational amplifier 52 connected as shown with resistors R30, R32 and R33, and capacitor C20. The ramp voltage, having a waveform which includes portions of positive and negative slope, is derived from the junction of the inverting input of operational amplifier 52 and capacitor C20. A square wave of a frequency synchronised to that of the ramp voltage is generated at the output of the operational amplifier 52 and is fed to a divide-by-two circuit 53, having mutually out of phase outputs Q and $\overline{Q}$.

The PWM comparator 51 compares the ramp voltage with the error voltage $V_e$ and provides pulses at the output whose width is dependent on the time during which one of these voltages exceeds the other. This PWM output is then gated in NAND gates 54,44 by antiphased square waves derived from the Q and $\overline{Q}$ outputs of the divide-by-two circuit 53, the frequency of these square waves being half that of the PWM output. The effect of such gating by the NAND gates 54,55 is to provide mutually out of phase i.e. alternate pulses to connections B1 and B2 and hence to the bases of transistors Tr8 and Tr9 (not shown), the width of the pulses being dependent on the magnitude of voltage $V_e$.

Figure 6:
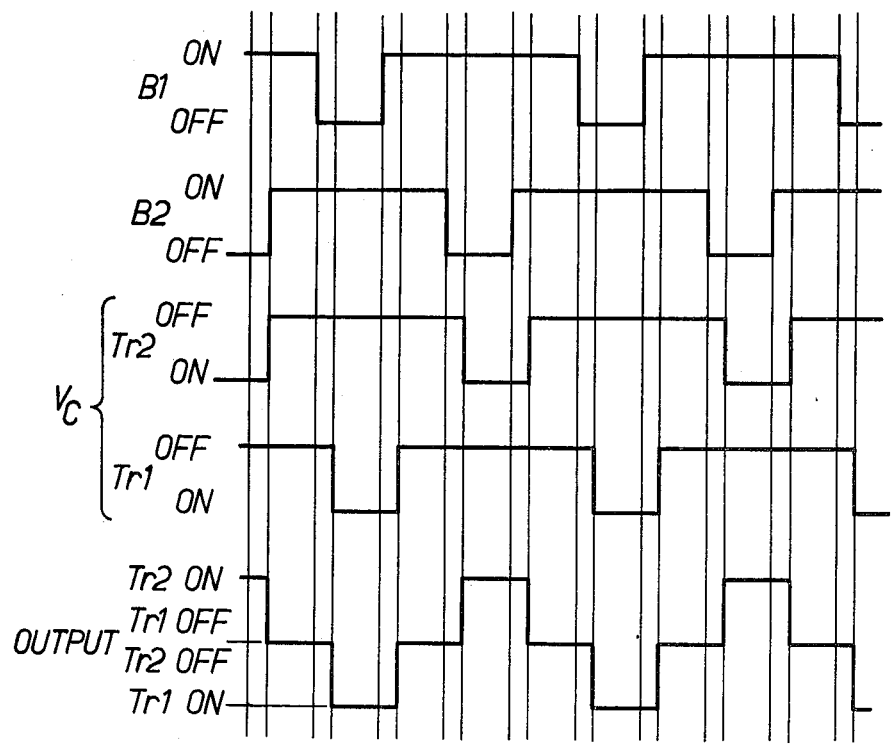
FIG. 6 shows waveforms at various points of FIG. 5, and FIG. 1 when combined.

The effect of such base drive pulses is shown in FIG. 6. It will be seen from the waveforms $V_{B1}$, $V_{B2}$ that the conduction periods of Tr8 and Tr9 now overlap, that is when, for instance, Tr8 turns on in order to initiate an inverter transition from Tr1 to Tr2, Tr9 also remains on for some period of time. The effect of this is that although Tr1 is turned off by Tr8, the flux reversal mechanism which then should turn on Tr2, does not take place because of the short circuiting effect of Tr9. The inverter is then left with neither transistor Tr1 or Tr2 conducting, and in effect, a "dwell" period is introduced into the inverter operation. The end of the dwell period comes when Tr9 turns off in response to control from NAND gate 55, and Tr2 is then turned on by the current flowing through R13.

It will be seen that by controlling the period of overlap of Tr8 and Tr9, the inverter can be caused to operate with controlled "dwell" periods. The output waveform shown (in output transformer T2) can be controlled to provide a rectified and smoothed output voltage whose magnitude depends on the extent of the pulse width modulation. In FIG. 6, the control is derived as voltage $V_e$ from the error voltage generator 50; the generator being responsive to both output current and output voltage. The control may be modified by using only one or other of these output parameters e.g. to provide a constant mean voltage, or alternatively the feedback loop may be broken and the output of the inverter externally controlled by applying a control voltage to the PWM comparator 51 instead of error voltage $V_e$.

The method of driving the inverter with overlapping periods of each short-circuit polarity allows pulse-width modulation of the output whilst preserving many of the advantages of the free-running inverter, e.g. as described in the aforementioned U.S. Pat. No. 4,164,014.

It will be seen that, although the description relating to the free-running half-bridge inverter specifies that the transformer T1 is designed to saturate in order to effect switching transitions, once the switching is externally controlled as described, there is no need for such a mechanism, and the transformer need not be designed with this requirement in mind.

Although the embodiments which have been described include fixed frequency pulse generators, it will be seen that the frequency can be arranged to be variable, either manually or automatically, for instance in response to changes in output conditions. This can be used to provide variable frequency, variable mark-to-space ratio control of transistors Tr8 and Tr9, where the "dead time" is constant and the frequency is varied to achieve mark-to-space control.

Furthermore, the circuits shown in FIGS. 1, 4 and 5 include the so-called half-bridge inverter. The same control methods can be applied to other known forms of feedback inverter such as push-pull and full-bridge types.

What is claimed is:

1. Power supply apparatus including an inverter circuit connected with a source of unidirectional voltage, said inverter circuit comprising:
  (a) at least first and second switching devices (TR1, TR2) connected with said voltage source, each of said switching devices including a control terminal for controlling the respective switching device between conducting and non-conducting conditions;
  (b) transformer means (T1) cyclically co-operating with said switching devices for alternating each switching device between conducting and non-conducting conditions, said transformer means including first and second switching windings (T1A, T1B) connected with the respective control terminals of said first and second switching devices, said transformer means further including a load winding (T1C) and a control (T1D), said load winding being adapted for connection with a load, load current being reflected from said load winding into said switching windings, whereby alternate conduction of said first and second switching devices is maintained during reflection of the load current to apply said voltage source in alternate sense across said load;
  (c) short-circuit switching means connected with said control winding, said short-circuit switching means comprising first polarity switch means (TR8, D6) selectively providing a short-circuit path of one polarity, and second polarity switch means (TR9, D5) selectively providing a short-circuit path of the opposite polarity, whereby upon the application of a short circuit to said control winding by a respective one of said first and second polarity switch means, reflection of load current from said load winding to a respective one of said switch windings is terminated, thereby to render non-conducting the respective one of said switching devices; and
  (d) means (16) for alternatively activating said first and second polarity switch means to provide a period of overlap between short circuits applied to said control winding by said first and second polarity switch means, said period of overlap providing a dwell period between switch-off of one said switching device and switch-on of the other said switching device, thereby to obtain pulse width modulation of the output to said load by said activating means.

2. Apparatus as defined in claim 1, wherein said activating means controls said period of overlap between short circuits in response to an output parameter of said inverter circuit.

3. Apparatus as defined in claim 2, wherein said activating means controls said period of overlap between short circuits so as to obtain a constant mean output voltage of said inverter circuit.

4. Apparatus as defined in claim 1, wherein each said polarity switch means is a semi-conductor switch.

5. Apparatus as defined in claim 4, wherein each said polarity switch means comprises a bipolar transistor connected with a respective one end of said control winding.

6. Apparatus as defined in claim 5, wherein each said polarity switch means further comprises a rectifier device connected with the opposite end of said control winding, the polarity of the rectifier device being such as to pass to current in the same direction as its respective bipolar transistor.

7. Apparatus as defined in claim 1, wherein said activating means comprises a control pulse generator means providing first and second trains of pulses to said first and second polarity switch means, respectively, said period of overlap provided by overlapping pulses in said first and second trains.

8. Apparatus as defined in claim 7, wherein said control pulse generator means is connected with an output terminal of said inverter circuit, said generator means including error voltage generating means responsive to at least one parameter of the output of said inverter circuit for generating an error voltage which controls overlap of said first and second trains of pulses.

9. Apparatus as defined in claim 1, and further including constant drive means connected with either end of said control winding for maintaining said switching devices conducting under conditions of low load current and for ensuring switchon of said switching devices in the absence of sufficient current feedback reflected to said swithc windings.

10. Apparatus as defined in claim 7, wherein said control pulse generator means operates at a fixed frequency to provide said first and second trains of pulses having a variable mark-to-space ratio.

11. Power supply apparatus including an inverter circuit connected with a source of unidirectional voltage, said inverter circuit comprising:
(a) a least first and second switching devices (TR1, TR2), connected with said voltage source, each of said switching devices including a control terminal for controlling the respective switching device between conducting and non-conducting conditions;
(b) a transformer (T1) for cyclically co-operating with said switching devices for alternating each switching device between conducting and non-conducting conditions, said transformer including first and second switching windings (T1A, T1B) connected to the respective control terminals of said first and second switching devices, said transformer further including a load winding (TIC) and control winding (TID), said loading winding being connected to a load, load current being reflected from said load winding into said switching windings, whereby alternate conduction of said first and second switching devices is maintained during reflection of the load current to apply said voltage source in alternate sense across said load;
(c) short-circuit switching means (TR8, TR9, D5) connected with said control winding to apply a short circuit to said control winding which terminates reflection of load current from said load winding to said switch windings thereby to render said switching devices non-conducting; and
(d) constant drive means (R12, R13, +V1) connected with said control winding for maintaining said switching devices conducting under conditions of low load current and for ensuring switch-on of said switching devices in the absence of sufficient current feedback reflected to said switch windings.

12. Apparatus as defined in claim 11, wherein said constant drive means provides drive to said control winding in dependence on the switching of said short-circuit switching means.

13. Apparatus as defined in claim 12, wherein said short-circuit switching means comprises first polarity switch means providing a short circuit path of one polarity, and second polarity switch means providing a short circuit path of the other polarity.

14. Apparatus as defined in claim 13, and further including control pulse generator means for generating first and second trains of pulses to activate said first and second polarity switch means, respectively.

15. Apparatus as defined in claim 14, wherein said control pulse generator means generates said first and second trains of pulses thereby causing the short circuit applied by said short circuit switching means to effect an inverter switching transition from one semiconductor switching device to the other semiconductor switching device.

16. Apparatus as defined in claim 15, wherein said control pulse generator means generates said first and second trains of pulses to activate the respective polarity switch means for a period at least sufficient to effect a switching transition from one semiconductor switching device to the other semiconductor switching device.

17. Apparatus as defined in claim 16, wherein said control pulse generator means generates said first and second train of pulses such that said trains of pulses are mutally complementary and each has an equal mark-to-space ratio.

18. Apparatus as defined in claim 14, wherein said control pulse generator means comprises a multivibrator circuit.

19. Apparatus as defined in claim 4, wherein each said polarity switch means is a semi-conductor switch.

20. Apparatus as defined in claim 19, wherein said constant drive means is connected at the junction between a respective polarity semi-conductor switch and one end of said control winding.

21. Apparatus as defined in claim 20, wherein said constant drive means comprises a source of direct current, and first and second resistance means each connected between said direct current source and a respective said junction between respective ones of said first and second polarity semi-conductor switches and ends of said control winding.

* * * * *